United States Patent [19]

Rosaen

[11] Patent Number: 4,700,742

[45] Date of Patent: Oct. 20, 1987

[54] AUTOMATIC SHUT-OFF DEVICE

[76] Inventor: Lars O. Rosaen, 1755 E. Nine Mile Rd., Hazel Park, Mich. 48030

[21] Appl. No.: 912,046

[22] Filed: Sep. 29, 1986

[51] Int. Cl.[4] ............................................. F16K 37/00
[52] U.S. Cl. .................................. 137/557; 137/460; 137/559; 116/275; 116/276
[58] Field of Search ............... 137/459, 460, 557, 559; 116/273, 275, 276

[56] References Cited

U.S. PATENT DOCUMENTS

| 3,171,432 | 3/1965 | Bard | 137/460 |
|---|---|---|---|
| 3,434,493 | 3/1969 | Owens | 137/460 |
| 4,022,245 | 5/1977 | Davis | 137/559 |
| 4,188,971 | 2/1980 | Otteson | 137/460 |
| 4,346,607 | 8/1982 | Rosaen | 116/275 |

FOREIGN PATENT DOCUMENTS

WO85/00867  2/1985  PCT Int'l Appl. ................ 137/459

*Primary Examiner*—A. Michael Chambers

*Attorney, Agent, or Firm*—Gifford, Groh, VanOphem, Sheridan, Sprinkle and Dolgorukov

[57] ABSTRACT

An automatic shut-off device for interrupting flow to a remote system in response to a flow fault associated with the remote system. The device generally includes a flow detection assembly, which senses the fluid flow through the remote system, and a fault detection assembly, which detects an interruption in the flow associated with the remote system and accordingly shuts-off fluid flow through the flow detection assembly. The flow and fault detection assemblies are remotely housed yet are mechanically connected by a common valve stem which connects the fault valve assembly with the flow interruption assembly. A metering assembly disposed in the flow detection assembly is responsive to the fluid flow and provides a visual indication of the flow rate through the system. Also provided are means for manually resetting the device in order to provide fluid flow upon correction of the fault.

9 Claims, 2 Drawing Figures

AUTOMATIC SHUT-OFF DEVICE

BACKGROUND OF THE INVENTION

I. Field of the Invention

This invention relates to automatic shut-off devices and, in particular, to a shut-off device for interrupting the flow to a remote system in response to a flow fault associated with the remote system.

II. Description of the Prior Art

Fluid flow for cooling is utilized in a wide variety of mechanical systems and can be critical for the proper operation and maintenance of such systems. This is particularly true of welding systems which rely on a continuous flow of a cooling fluid through the welding tips in order to prevent damage and malfunction of the welding system. Generally, fluid is provided to multiple systems from a common source through a series of flow lines. In the event of a disruption of flow due to a line breakage, the extreme heat could cause damage to the system.

The previously known systems have relied on audible or visual alarms to warn the system operator of a flow fault whereupon the operator would shut down the system. However, because the period between the fault detection and shutdown may be prolonged, severe damage could occur. Moreover, depending upon where the flow fault occurs, the alarm system may not be capable of accurately determining the fault thereby permitting continued operation and damage to the system.

In addition, in an industrial setting such systems are normally set up as multiple stations wherein fluid flow is continuous to the individual systems and flow should only be interrupted to the individual system at which the fault occurs. Thus, it would be preferred that a simple yet compact shut-off system be installed in the flow path for the individual systems.

SUMMARY OF THE PRESENT INVENTION

The present invention overcomes the disadvantages of the previously known shut-off devices by providing a mechanical shut-off valve wherein the fault detection means is remote yet mechanically connected to the flow detection assembly.

The shut-off device according to the present invention generally comprises a flow detection assembly which measures and monitors the fluid flow from the fluid source to the remote device and a fault detection assembly which detects a fault in the fluid flow and accordingly shuts off fluid flow to the remote device. Although the flow detection and fault detection assemblies are incorporated into separate housings, the two assemblies are located proximally to each other and are connected by a common valve stem.

The flow detection assembly is essentially a fluid flow meter having inlet and outlet ports and a fluid passageway disposed therebetween. A pivotally secured flow vane is mounted within the fluid passageway and is responsive to the fluid flow therethrough. Also disposed within the passageway is the shut-off valve which is connected to the stem of the fault detection assembly and mates with a restrictive port in the fluid passageway to interrupt fluid flow through the system.

Proximally located to the flow detection assembly is the fault detection assembly. This assembly also includes inlet and outlet ports so that fluid from the remote system passes through the inlet port, through the detection assembly and through the outlet port to the discharge reservoir. Disposed within the housing of the fault detection system is a spring-biased valve assembly which includes a valve head and a valve stem. The valve stem extends externally of the housing and also into the flow detection assembly. Secured to the external portion of the valve stem is a handle for convenient, manual resetting of the shut-off device upon flow interruption.

Other objects, features and advantages of the invention will be apparent from the following detailed description taken in connection with the accompanying drawings.

BRIEF DESCRIPTION OF THE DRAWING

The present invention will be more fully understood by reference to the following detailed description of a preferred embodiment of the invention when read in conjunction with the accompanying drawing, in which like reference characters refer to like parts throughout the several views, and in which.

DETAILED DESCRIPTION OF A PREFERRED EMBODIMENT OF THE PRESENT INVENTION

Figures 1, 2:
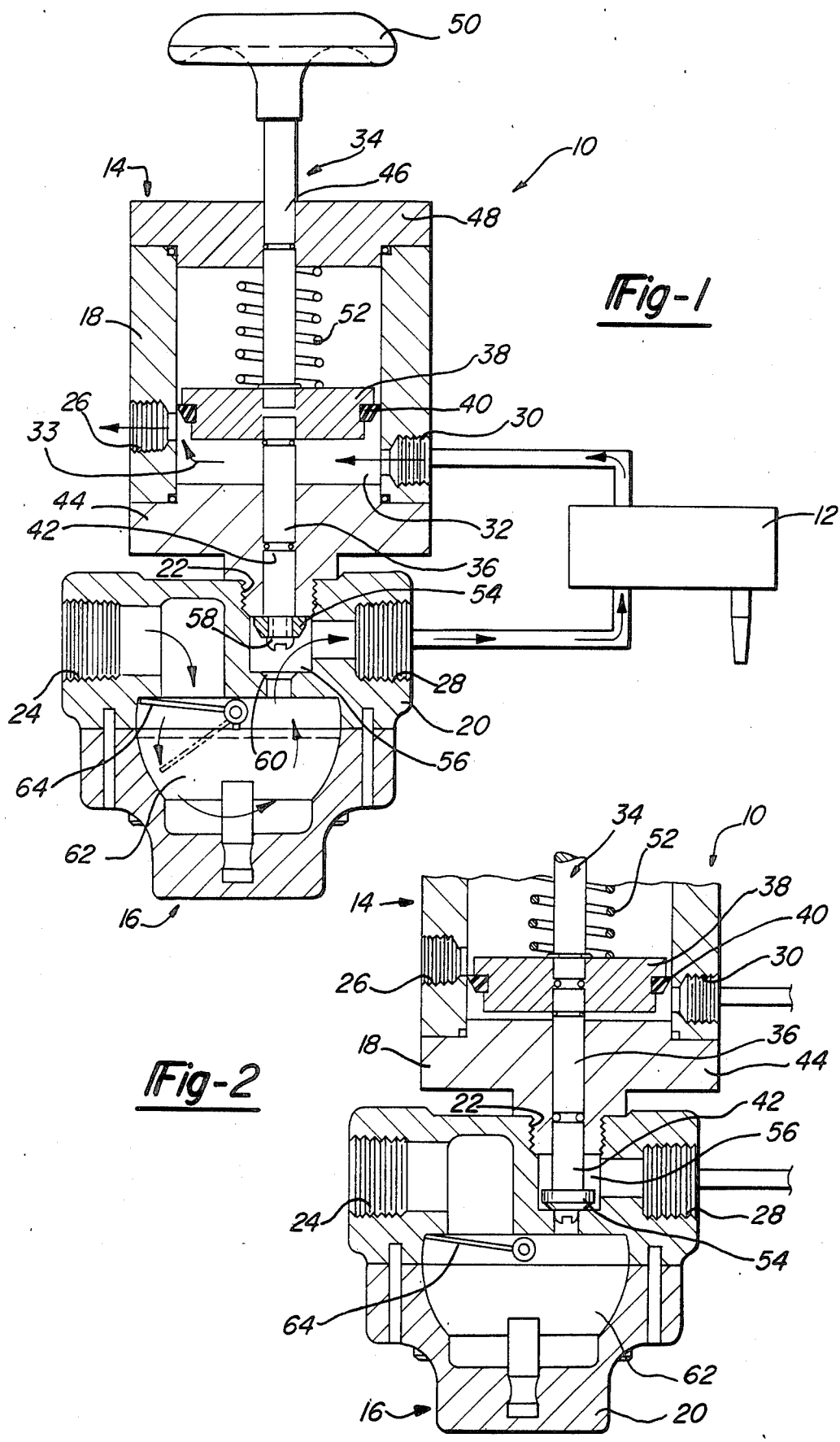
FIG. 1 is a cross-sectional view of the present invention in its operational position.
FIG. 2 is an enlarged cross-sectional view of a portion of the present invention in its shut-down position.

Referring to FIGS. 1 and 2, an automatic shut-off device 10 is thereshown for detecting a fluid flow fault associated with a remote fluid system 12 such as a welding system which depends on a fluid coolant to maintain proper operating temperatures. The device 10 generally comprises a fluid flow fault detection assembly 14 and a flow indicator assembly 16, both of which are maintained in isolated and separable housings, 18 and 20, respectively. Preferably, the housings 18 and 20 include threaded portions 22 whereby the housings 18 and 20 are rotatably separable. However, it is to be understood that the housings 18 and 20 may be permanently secured to one another or secured by means other than the cooperating threaded portions 22.

The device 10 includes an inlet port 24 associated with the flow indicator assembly 16 and an outlet port 26 associated with the fault detection assembly 14. The inlet port 24 is fluidly connected to a pump (not shown) which supplies the coolant fluid from a remote reservoir. Similarly, the outlet port 26 is fluidly connected to a fluid reservoir which receives the fluid coolant for recirculation. In addition to the main inlet and outlet ports, 24 and 26, the housings 18 and 20 are provided with secondary ports which fluidly connect the device 10 to the remote fluid system 12. The outlet port 28 of the flow indicator assembly 16 is fluidly connected to supply fluid to the remote fluid system 12. Conversely, inlet port 30 of the fault detection assembly 14 is fluidly connected to accept the fluid flow from the remote fluid system 12. Thus, the device 10 provides a closed-loop fluid system which is readily installed in the supply and return flow lines of the existing fluid system.

Referring first to the fault detection assembly 14, as is best shown in FIG. 1, disposed between the inlet port 30 and the outlet port 26 is a fluid passageway 32 which is defined by the fault detection housing 18. Slidably disposed within the fluid passageway 32, having a chamber 33, is a valve member 34 which is movable between an open position as shown in FIG. 1 and a closed position as shown in FIG. 2. Operation of the valve member 34 will be described in greater detail herein.

The valve member 34 generally includes an elongated valve stem 36 slidably mounted to and extending through said fault detection housing 18 and a first valve head 38 secured to an intermediate portion of said valve stem 36. The valve head 38 includes a seal 40 to provide sealing engagement between the valve head 38 and the side walls of the housing 18. The valve stem 36 includes a first end 42, which extends through the end wall 44 and into the flow indicator housing 20, and a second end 46 which extends through the removable end wall 48. Secured to the end 46 of the valve stem 36 exteriorly of the housing 18 is a handle 50 which allows for manually urging the valve member 34 to its open position in order to initiate flow through the device 10 as will be described in greater detail herein.

As is best shown in FIG. 1, disposed between the valve head 38 and the removable wall 48 of the fault detection housing 18 is a coil spring 52 which urges the valve member 34 to its closed position. The spring 52 is replaceable in order to vary the tension against the valve head 38 by first removing the wall 48. Replacement of the spring 52 may be necessary in order to cause shut down of the fluid flow at different rates according to the specifications of the remote fluid system 12.

Referring now to FIG. 2, secured to the end 42 of the valve stem 36 is a second valve head 54 which is disposed exteriorly of the fault detection housing 18 and within the fluid passageway 56 between the inlet and outlet ports 24 and 28 of the flow indicator housing 20. The second valve head 54 is preferably secured to the valve stem 36 by a bolt 58 which extends through the valve head 54 and into the end 42 of the stem 36 and forms a portion of the valve head 54. Formed in the fluid passageway 56 is a valve seat 60 which cooperates with the valve head 54 in order to interrupt fluid flow through the fluid passageway 56 of the flow indicator housing 20 as will be described in greater detail hereinafter.

The fluid passageway 56 also includes an indicator chamber 62 which houses means responsive to the fluid flow rate for visually indicating the flow rate through the flow indicator housing 20. Preferably, the flow responsive means comprises a flow rate indicator vane 64 pivotally mounted within the chamber 62 which pivots in accordance with the fluid flow through the chamber 62, yet is resiliently urged towards the at rest or zero flow position shown in FIG. 2. Thus, depending upon the rate of fluid flow through the flow indicator housing 20 the vane 64 will pivot accordingly in order to provide a visual indication of the flow rate. Preferably, the housing 20 includes a transparent housing portion with means for visually determining the flow rate through the device 10. Alternatively, the vane 64 may be electronically connected to remote indicator means for determining the flow rate on a control panel or the like so that a plurality of stations may be simultaneously monitored.

Operation of the present invention provides an automatic shut-off device 10 for interrupting the fluid flow to a remote fluid system 12 in response to a flow fault associated with the remote system. Operation is initiated with the valve member 34 in its closed position as shown in FIG. 2. In this position, fluid flow is prevented through the outlet port 28 of the flow indicator assembly 16 by the cooperation of the second valve head 54 with the valve seat 60. Thus, although fluid will be continuously supplied by the supply pump, flow to the remote system 12 is interrupted and the flow rate indicator 64 will show no flow through the housing 20.

In order to initiate fluid flow to the remote system 12, the valve member 34 must be urged towards its open position as shown in FIG. 1. This is accomplished by manually pulling on the handle 50 thereby opening the fluid passageway 56 and permitting fluid flow through the outlet 28. Alternatively, the valve member 34 may be mechanically connected to an automatic system associated with a central control whereby the valve member 34 is urged towards its open position through mechanical controls. In either embodiment, once fluid flow is initiated through the flow indicator housing 20, the coolant fluid flows to the remote system 12 and then returns to the fault detection assembly 14. As fluid from the remote system 12 flows through the inlet port 30 and into the fluid passageway 32 of the fault detection housing 18, the force of the fluid flow maintains the valve member 34 in its open position by urging the valve head 38 against the spring 52. Thus, in order to maintain the valve member 34 in its open position, a minimum fluid flow rate must be maintained in accordance with the compression constant of the spring 52. As is noted above, in order to customize the present invention according to a minimum flow rate to the remote system 12, springs 52 having different compression constants may be substituted so that fluid flow is interrupted when the flow rate falls below a predetermined level.

After fluid flow to the remote station has been initiated by manually moving the valve 34 from the position shown in FIG. 2 to the position shown in FIG. 1, the fluid pressure within the chamber 33 maintains the valve 34 in an open position due to the large area of the valve head 38. Conversely, once the valve 34 moves to the closed position shown in FIG. 2, the valve 34 remains closed despite high pressure at the inlet 24 due to the small area of the second valve head 54.

In the event of a fluid flow fault associated with the remote fluid system 12 or its feed and return lines, the fluid flow rate through the fluid passageway 32 will fall below the predetermined level thereby causing the valve member 34 to move to its closed position. As the first valve head 38 of the fault detection assembly 14 and the valve stem 36 move towards the closed position, the second valve head 54 once again cooperates with the valve seat 60 thereby interrupting fluid flow to the remote system 12. Since flow faults are usually caused by a line break or other leak, the present invention automatically interrupts continued flow through the system thereby preventing possible damage to the system and the surrounding area. Additionally, the remote system 12, such as a welder, may be directly tied to the fluid flow whereby upon interruption of the fluid flow, the system 12 is caused to shutdown.

Furthermore, a visual or audible alarm may be associated with the flow rate indicator 64 so that upon detection of a zero flow rate, the alarm would alert an attendant of the flow fault. However, during operation of the system, the flow rate indicator 64 provides a continuous visual indication of the flow rate through the device 10 thereby permitting adjustment of the flow rate in accordance with user specifications.

Thus, the present invention provides a simple device which may be readily installed in a coolant system for a remote device in order to interrupt the fluid flow to the remote device upon detection of a flow fault. In addition, the device provides a continuous indication of the flow rate through the system in order to provide convenient monitoring.

The foregoing detailed description has been given for clearness of understanding only and no unnecessary limitations should be understood therefrom as some modifications will be obvious to those skilled in the art without departing from the scope and spirit of the appended claims.

I claim:

1. An automatic shut-off device for detecting a fluid flow fault associated with a remote fluid system and interrupting fluid flow to the remote system in response to the flow fault, said shut-off device comprising:

a fault detection assembly having a housing portion, an inlet port, an outlet port, and a fluid passageway all formed in said housing portion and said fluid passageway fluidly connecting said inlet port to said outlet port, said fault detection assembly further comprising a fluid responsive means disposed within said fluid passageway and axially movable in response to changes in fluid flow through said fluid passageway, means fluidly connecting said remote system to said inlet port, a flow indicator assembly having a housing portion, an inlet port, an outlet port and a fluid passageway all formed in said housing portion and said fluid passageway fluidly connecting said inlet port and said outlet port, said flow indicator assembly further comprising second fluid responsive means disposed within said fluid passageway of said indicator assembly such that it is directly responsive to fluid flow, and operable to visually indicate exteriorly of said housing portion the flow rate of fluid flowing through said fluid passageway, means fluidly connecting said remote system to said outlet port of said flow indicator assembly whereby fluid normally flows through said outlet port of said flow indicator assembly, through said remote system and to said inlet port of said fault detection assembly, and valve means disposed within said fluid passageway of said fluid indicator assembly and operably connected with said fluid responsive means of said fault detector assembly to move to a position closing fluid flow to said fluid indicator assembly outlet and thus to said remote system upon fluid pressure in said fluid passageway of said fault detection assembly falling below a predetermined value to thereby shut down fluid flow through said remote system.

2. The invention as defined in claim 1 wherein said fluid responsive means of said fault detection assembly comprises an elongated valve stem slidably mounted in said fault detection housing and extending through said housing into said flow indicator housing and a piston secured to an intermediate portion of said valve stem within said fluid passageway of said fault detection assembly having to axially move said valve stem in response to changes in fluid pressure in said fluid passageway.

3. The invention as defined in claim 2 wherein said means for closing the fluid flow to said remote fluid system comprises a valve head secured to a first end of said valve stem which extends into said flow indicator housing, said valve head cooperating with a valve seat formed in said fluid passageway of said flow indicator assembly and being movable by said piston between an open and a closed position.

4. The invention as defined in claim 3 and further comprising means for manually urging said flow responsive means and to its open position, said means comprising a handle secured to a second end of said valve stem exteriorly of said fault detection housing.

5. The invention as defined in claim 1 wherein said second fluid responsive means responsive comprises an elongated vane pivotally secured to one wall of said flow indicator housing and means for providing a visual indication of the flow rate through said fluid passageway of said flow indicator assembly.

6. The invention as defined in claim 3 wherein said valve means is maintained in its open position by the fluid flow through said fluid passageway of said fault detection assembly and wherein said valve means moves to its closed position when the fluid flow rate through said fluid passageway falls below a predetermined minimum level whereby fluid flow is interrupted to said remote fluid system by said valve head moving to its closed position in cooperation with said valve seat.

7. The invention as defined in claim 6 wherein said means for urging said valve means to its closed position is replaceable such that said predetermined minimum flow rate is variable.

8. The invention as defined in claim 6 wherein said means for urging said valve means to its closed position comprises a coil spring disposed between said first valve head and a wall of said fault detection housing.

9. The invention as defined in claim 1 wherein said fault detection housing and said flow indicator housing are rotatably secured to each other.

* * * * *

UNITED STATES PATENT AND TRADEMARK OFFICE
CERTIFICATE OF CORRECTION

PATENT NO. : 4,700,742

DATED : October 20, 1987

INVENTOR(S) : AUTOMATIC SHUT-OFF DEVICE-- Lars O. Rosaen

It is certified that error appears in the above-identified patent and that said Letters Patent is hereby corrected as shown below:

Col. 3, line 27, delete "responsive" second occurrence.

Signed and Sealed this

Fifth Day of April, 1988

Attest:

DONALD J. QUIGG

Attesting Officer

Commissioner of Patents and Trademarks